United States Patent
Strehl et al.

(10) Patent No.: US 8,032,535 B2
(45) Date of Patent: Oct. 4, 2011

(54) PERSONALIZED WEB SEARCH RANKING

(75) Inventors: Alexander L. Strehl, Astoria, NY (US); Sharad Goel, New York, NY (US); John Langford, White Plains, NY (US); Sham Kakade, Chicago, IL (US)

(73) Assignee: Yahoo! Inc., Sunnyvale, CA (US)

( * ) Notice: Subject to any disclaimer, the term of this patent is extended or adjusted under 35 U.S.C. 154(b) by 344 days.

(21) Appl. No.: 12/427,656

(22) Filed: Apr. 21, 2009

(65) Prior Publication Data

US 2010/0268710 A1 Oct. 21, 2010

(51) Int. Cl.
*G06F 17/30* (2006.01)
*G06F 7/00* (2006.01)
(52) U.S. Cl. ........................................ 707/748; 707/769
(58) Field of Classification Search .................. 707/748, 707/769
See application file for complete search history.

(56) References Cited

U.S. PATENT DOCUMENTS

| | | | |
|---|---|---|---|
| 7,698,324 B2 * | 4/2010 | Vries ............................ | 707/698 |
| 7,836,058 B2 * | 11/2010 | Chellapilla et al. ........... | 707/748 |
| 2004/0024751 A1 * | 2/2004 | Petrisor et al. .................... | 707/3 |
| 2009/0248657 A1 * | 10/2009 | Chellapilla et al. ............... | 707/5 |

* cited by examiner

*Primary Examiner* — Kuen Lu
(74) *Attorney, Agent, or Firm* — Hickman Palermo Truong & Becker LLP

(57) ABSTRACT

A system and method for personalized search ranking may use a user's feedback to immediately reorder search results for this particular user so as to improve click-through rate. Upon receiving a query including one or more words, a search engine may identify a list of search results and display the search results on a search result page. A machine-learning module may collect information about a user's browsing activities on the result page, update estimates of relevance of the search results, and reorder the search result list to personalize it for the user.

16 Claims, 2 Drawing Sheets

PERSONALIZED WEB SEARCH RANKING

BACKGROUND

1. Field of the Invention

The present invention relates generally to Internet search, and more particularly to ordering of search results.

2. Description of Related Art

A search engine may allow users to search for web pages or other materials accessible over the Internet with one or more search terms. After receiving from a user a query including one or more words, a search engine may identify web pages that may be related to the words, and display on a result page information about the web pages as a list of search results, e.g., a link to a web page containing the word(s). The search results may be ranked according to their relevance to the words, with the most relevant search result being positioned at the top of the list. The relevance may be determined according to search engine algorithms of a search engine service provider.

There can be millions of search results returned for an Internet search. The list of search results may go on for a number of result pages, and each result page may expand over several screens. Whether a search result is clicked on or not depends on whether and where it was displayed. For example, web users tend to click on search results near the top of search result pages more often. The bottom result on a search result page is typically clicked on substantially less often than is the top result, even if the actual content of the bottom result is more relevant to a search.

In addition, when different people type in the same query to a search engine, they often mean different things. For example, the query "apple" may refer to the fruit or the company of the same name. If the order of returned search results is not right for a particular user and his query, the user may ignore search results which are more relevant to his search but are placed in less prominent positions, resulting in a low click-through rate.

Therefore, it may be desirable to provide a system and method which may personalize the order of search results to decrease the bias introduced by position effects and increase the click-through rate.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method for personalized search ranking which may use a user's feedback to immediately reorder search results for this particular user so as to improve click-through rate. Upon receiving a query including one or more words, a search engine may identify a list of search results and display the search results on a search result page. If a user is interested in a search result, he may mouse over it or click on the link to open the web page and get more information. A machine-learning module may collect information about a user's browsing activities on the result page, update estimates of relevance of the search results, and reorder the search result list to personalize it for the user. Since the search results are positioned according to the user's browsing activities which may indicate what he is really looking for, it is more likely that search results relevant to the user's search may get the user's attention, and it is more likely that the user will click on the search results.

A symbol may be defined as an atomic element in the personalized search ranking process. A symbol may be a word or the combination of a word and a context. For example, "query_apple" may be a symbol that indicates the presence of the word "apple" in a query. A symbol pair may include a word from the query and a word from a result. A weight may be assigned to each symbol pair, and may be used to calculate the estimate of relevance of a search result.

The invention may be carried out by computer-executable instructions, such as program modules or other software, running on a computer or other microprocessor-based device. Advantages of the present invention will become apparent from the following detailed description.

Figure 1:
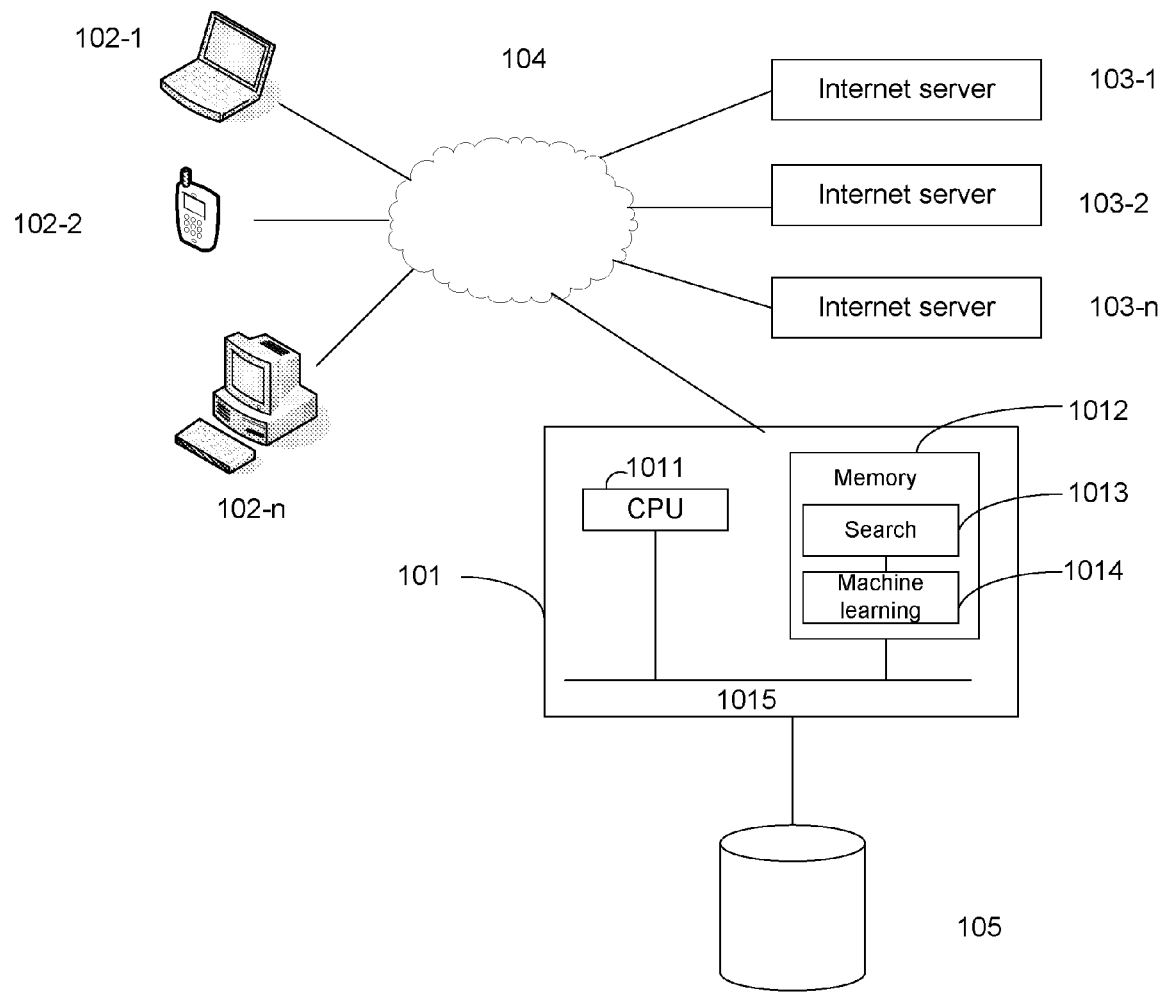
FIG. 1 illustrates a system for providing personalized search ranking according to one embodiment of the present invention.

FIG. 1 illustrates a system for providing personalized search ranking according to one embodiment of the present invention. As shown, a number of user terminals 102-1, 102-2, . . . 102-n, a search server 101 and a number of Internet servers 103-1, 103-2, . . . 103-n may communicate with each other over a computer network 104. The search server 101 may access a database 105 for user profiles, e.g., a user's demographic information, previous queries and previous search results that have been clicked on.

The user terminal 102-1, 102-2, . . . or 102-n may be a desktop computer, a laptop computer, a personal digital assistant (PDA), a smartphone, a set top box or any other electronic device that can access the computer network 104. A user terminal may have a CPU, a memory, a user interface, an interface to the computer network 104, and a display. The user terminal may also have a browser application configured to receive and display web pages, which may include text, graphics, multimedia, etc. The web pages may be based on, e.g., HyperText Markup Language (HTML) or extensible markup language (XML).

The Internet server 103-1, 103-2, . . . or 103-n may be a computer system, running a website or a blog.

The computer network 104 may be, e.g., the Internet. Network connectivity involving any of the aforementioned devices may be wired or wireless, using one or more communications protocols, as will be known to those of ordinary skill in the art.

The search server 101 may be a computer system and may be used as, e.g., a server in an Internet search system, a server in an Internet advertising system, or a server in a user recommendation system. The search server 101 may include a central processing unit (CPU) 1011 and a memory 1012, which communicate with each other and other parts in the computer system via a bus 1015. Alternatively, the search server 101 may include multiple computer systems each configured to accomplish certain tasks and coordinate with other computer systems to perform the method of the present invention.

The CPU 1011 may perform computer software modules stored in the memory 1012 to carry out a number of processes, including but not limited to the one described below with reference to FIG. 2. In one example, the CPU 1011 may execute a search module 1013 stored in the memory 1012 to receive a query over the computer network 104, identify web pages relevant to the query, calculate estimates of relevance of the web pages, rank the web pages based on their estimates of relevance, and generate a search result page with the web pages being displayed as a list of search results.

The CPU 1011 may also execute a machine-learning module 1014 to monitor a user's feedback, update weights assigned to symbol pairs each comprising a word from the query and a word from a result, and provide the updated weights to the search module 1013 to update the estimates of relevance of the search results. The machine-learning module 1014 may be a stand-alone module stored in the memory 1012, or integrated with the search module 1013.

The database 105 may store a user profile for each user, which may include, e.g., his demographic information, previous queries, previous search results the user has clicked on, and weights for symbol pairs in his previous searches.

Figure 2:
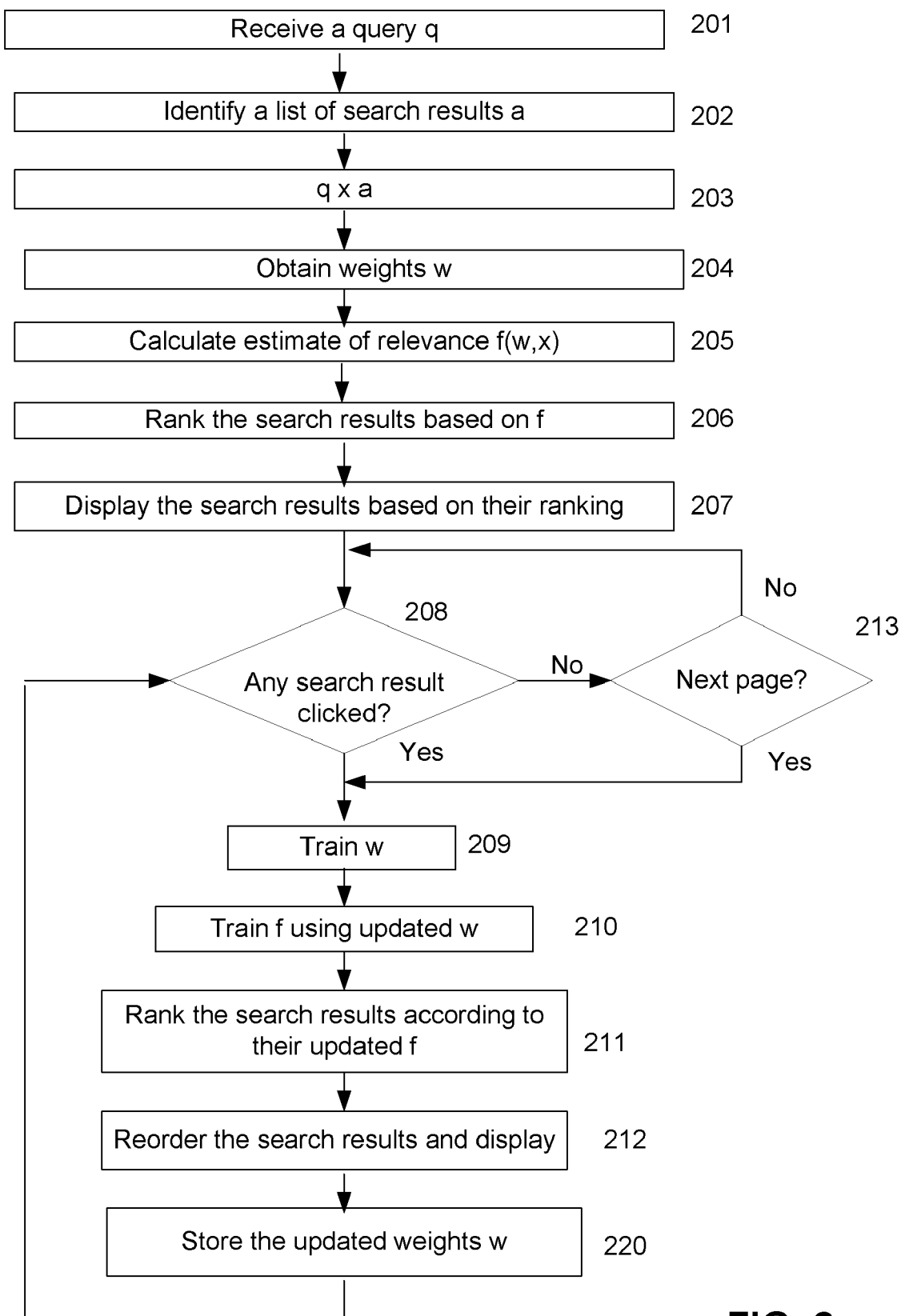
FIG. 2 illustrates a flow chart of a method for providing personalized search ranking according to one embodiment of the present invention.

FIG. 2 illustrates a flow chart of a method for providing personalized search ranking according to one embodiment of the present invention. The method may be used in the system shown in FIG. 1.

At 201, a user may arrive at a search website and type in a query which may include one or more words, e.g., apple.

In one embodiment, a query may be augmented by a set of symbols that describe a user. The symbols may be from the user's profile in the database 105. These symbols may contain the words of the last 100 queries the user typed and/or the text contained in the last 100 results he clicked on, for instance. The symbols may also contain other information about the user in his user profile, such as the user's geographic location, age, gender, education background, job and/or interests. For example, a user John may visit a search website and search for "apple." The query q in this search may be described by the following symbols (each symbol below is separated by a space):

"name_john sex_male location_new-york queryterm_apple interest_computers previous_Yahoo previous_soccer"

This query may indicate that the name of the user is "John," who is a male from New York, has an interest in "computers" and has in the past typed in queries that contained the words "Yahoo" and "soccer."

At 202, a set of potential search results a, including potential search results $a_1, a_2, \ldots a_n$, may be obtained by the search module 1013.

At 203, the query q and a potential search result $a_n$ may be combined into a set of symbol pairs, wherein each symbol pair may contain a symbol from the query q and a symbol from the potential result $a_n$. In one example, the query q is:

$$q\text{=``name\_john queryterm\_apple''} \quad (1)$$

A potential search result $a_1$ is:

$$a_1\text{=``apple computers''} \quad (2)$$

The combination of this query q and potential result $a_1$ may be represented as a set of symbols:

$$q \times a_1\text{=``name\_john:apple name\_john:computers queryterm\_apple:apple queryterm\_apple:computers.} \quad (3)$$

Thus, $q \times a_1$ ("q cross $a_1$") may contain a set of symbols, each of which contains one term from the query q and one term from the result $a_1$.

A query-result pair $q \times a_n$ may be obtained for each potential result, and q×a may include query-result pairs for potential results a, and may be mathematically represented as a bit vector in a high dimensional space. In particular, if there are M1 possible query symbols and M2 possible result symbols, then the bit vector x may have M1*M2 components. Each component may be specifically mapped to a symbol pair. The value of a component i, denoted x(i), is 1 if the symbol pair that i is mapped to appears in x, and 0 if the pair does not.

To avoid storing a large number of zeros, in one embodiment, only the non-zero symbol pairs may be stored. Thus, for the particular query q and result $a_n$ given above, the vector x would have 4 components of value 1 and a very large number of components of value 0. For instance the component that maps to the pair "name_john:dog" would have a value of 0.

Given a query q and an a search result $a_n$, an estimate of relevance, or probability of click, may be defined as:

$$f(w \cdot x), \quad (4)$$

wherein x is the vector encoding all symbol pairs each containing a symbol in the query q and a symbol in the potential result $a_n$; w is a vector of weights assigned to every pair of symbols; w·x is a sum of weights; and the function f may be some one-dimensional real-valued function (e.g., the sigmoid function tan h(x)). For each pair of symbols, there is precisely one weight in the sum w·x.

The weight vector may contain a non-zero value for all symbol pairs. For example, the weight vector for symbols in (3) may be:

$$w(\text{``name\_john:apple''})=-0.05$$

$$w(\text{``name\_john:computers''})=0.1$$

$$w(\text{``queryterm\_apple:apple''})=0.4$$

$$w(\text{``queryterm\_apple:computers''})=0.3 \quad (5)$$

Positive values may indicate that a user is likely to like a result, and the magnitude of the weights typically indicate the degree, e.g., a high value may indicate that the user is more likely to like a result, and a low value may indicate that the user is less likely to like a result. In the examples in (5), a weight 0.4 for the symbol pair ("queryterm_apple:apple") may indicate that results with the term "apple" are often considered relevant for queries with the term "apple".

Negative values may indicate that the user is likely to dislike the result. For example, a negative value for w("name_john:apple") may indicate that John tends to not like results with the term "apple."

At 204, the CPU 1011 may access the database 105 for the weights w. If a symbol pair appeared in the user's previous searches, its weight may be stored, together with the symbol pair, in the user's profile. If the user's profile does not have a symbol pair, its weight may be initialized to 0. The weights w may be trained in real time, being updated each time the machine-learning module 1014 obtains new information about a user, e.g., new results he clicked on. The updated weights w may be stored in the database 105.

In one embodiment, a profile may be stored for similar users, e.g., soccer fans, computer engineers, and New Yorkers. When a symbol pair is not in a user's previous searches, weights stored for users similar to him may be obtained from the database 105.

At 205, the CPU 1011 may calculate the estimate of relevance for each result according to (4), using the weights obtained at 204. For example, when the weights are those in (5), the estimate of relevance for the query q and result $a_n$ is:

$$f(-0.05+0.1+0.4+0.3)=f(0.75) \quad (6)$$

When f=Tan h, for example, the final score is 0.635149.

At 206, the potential results may be ranked according to their estimates of relevance f, from the highest to the lowest.

At 207, the potential search results may be displayed on a number of search result pages according to their ranking. The top k search results with the highest f may be displayed on the first search result page. If a "next-page" button on the search result page is clicked on, the next k results may displayed on a second search result page and so on. In one embodiment, k=10.

At 208, for every search result displayed in response to the query q, a click signal y may be observed.

If the user clicked on a result $a_n$, at 209, the weight vector w may be trained. In one embodiment, the weight vector w may be updated according to the following rule:

$$w_{updated} = w - e\text{Loss}'(f(w \cdot x), y) \quad (6)$$

wherein e is a learning rate; x is the vector representation of the query q and a result a as defined above; f(w·x) is the current estimate of relevance for the result; and Loss' is a derivative of a function Loss with respect to w. If the user clicked on a result $a_n$, y=1, otherwise y=0. The learning rate may ensure that weights change by only a small amount after each click event (click or no click), and may be, e.g., 0.1. In one embodiment, for simplicity, a squared loss may be used:

$$\text{Loss}(f(w \cdot x), y) = (y - f(w \cdot x))^2 \quad (7)$$

In one embodiment, if a result "apple computer" is clicked on, each weight in (5) may be increased by:

$$-e * \text{Loss}'(f(w \cdot x), y) = -e * 2 * (-1)(1 - f(w \cdot x)) f'(w \cdot x) \quad (8)$$

In one embodiment, when f=Tan h and e=0.1, the result of (8) is 0.0563614.

In one embodiment, since it may be difficult to represent and perform operations on a huge number of weights (one for every pair of symbols), the size of the weight space may be compressed by assigning the same weight to many different pairs of symbols, e.g., the pairs that share a symbol may be chosen at random.

At 210, for each result $a_n$, an updated estimate of relevance f may be calculated with the updated w. To simplify the calculation, in one embodiment, only weights w and estimates of relevance f for results on the current search result page are updated. In one embodiment, the weights w and estimates of relevance f for results on a second search result page are not updated until the user clicks on the "next-page" button.

At 211, the rank of the search results may be updated according to their updated estimates of the relevance f, from the highest to the lowest.

At 212, the search results may be reordered according to their updated ranks and displayed.

At 220, the updated weights may be stored in the database 105, and the process may then return to 208. It should be understood that the updated weights may be stored anytime after 209.

If the user did not click on any search result on the current search result page before clicking on the "next-page" button at 213, the weights w and estimates of relevance f may be trained at 208 assuming no results on the current search result page is clicked on.

If the user clicks on another search result, 208-220 may be repeated. Consequently, w may be constantly trained.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A computer implemented method for providing personalized search ranking, the method comprising:
   receiving a query from a user terminal including a query word;
   identifying first and second search results relevant to the query, wherein the first search result has a first result word and the second search result has a second result word;
   combining the query and the first and second search results to obtain a set of symbol pairs, wherein a first symbol pair contains the query word and the first result word and a second symbol pair contains the query word and the second result word;
   accessing a data storage device for weights for symbol pairs which were stored during a previous search;
   determining an estimate of relevance for each search result with the weights;
   ranking the search results according to their estimates of relevance;
   displaying the search results according to their ranks;
   detecting browsing activities on the search results;
   updating the weights when a search result is clicked on and storing the updated weights in the data storage device;
   updating the estimates of relevance with the updated weights; and
   reordering the search results according to the updated estimates of relevance;
   wherein the method is performed by one or more computer systems.

2. The method of claim 1, further comprising: displaying the search results reordered according to the updated estimates of relevance.

3. The method of claim 1, further comprising: updating the weights when no search result on a current search result page is clicked on and a "next-page" button is clicked on.

4. The method of claim 1, further comprising: storing in the data storage device a user profile with information selected from the group consisting of: the user's demographic information, one or more query words the user entered before, one or more results the user clicked on before, and weights for symbol pairs obtained in the user's previous searches.

5. The method of claim 4, further comprising: augmenting the query by using information from the user profile.

6. The method of claim 1, wherein the weights are updated for search results on a current search result page.

7. The method of claim 6, wherein when a next-page button is clicked on, weights for search results on a next search result page are updated with weights obtained from browsing activities on search results on the current search result page.

8. The method of claim 1, further comprising: when a user's search involving a symbol pair which is not in the user's previous searches, using weights for this symbol pair stored for similar users to calculate the estimate of relevance.

9. The method of claim 1, further comprising: when a user's search involving a symbol pair which is not in the user's previous searches, initializing the symbol pair's weight to 0.

10. A computer system for providing personalized search ranking, comprising:
    a data storage device;
    a processor; and
    one or more computer-readable media storing instructions which, when executed by the processor, cause:
    receiving a query from a user terminal including a query word;

identifying a first search result and a second search result relevant to the query, wherein the first search result has a first result word and the second search result has a second result word;

combining the query and the search results to obtain a set of symbol pairs, wherein a first symbol pair contains the query word and the first result word and a second symbol pair contains the query word and the second result word;

accessing the data storage device for weights for the symbol pairs which were stored during a previous search;

determining an estimate of relevance for each search result with the weights;

ranking the search results according to their estimates of relevance;

displaying the search results according to their ranks;

detecting browsing activities on the search results;

updating the weights when a search result is clicked on and storing the updated weights in the data storage device;

updating the estimates of relevance with the updated weights; and reordering the search results according to the updated estimates of relevance.

11. The computer system of claim 10, wherein the data storage device further stores a profile for a group of similar users.

12. A non-transitory computer-readable medium comprising instructions which, when performed by a computer, cause:

receiving a query from a user terminal including a query word;

identifying a first search result and a second search result relevant to the query, wherein the first search result has a first result word and the second search result has a second result word;

combining the query and the search results to obtain a set of symbol pairs, wherein a first symbol pair contains the query word and the first result word and a second symbol pair contains the query word and the second result word;

accessing a data storage device for weights for the symbol pairs which were stored during a previous search;

determining an estimate of relevance for each search result with the weights;

ranking the search results according to their estimates of relevance;

displaying the search results according to their ranks;

detecting browsing activities on the search results;

updating the weights when a search result is clicked on and storing the updated weights in the data storage device;

updating the estimates of relevance with the updated weights; and reordering the search results according to the updated estimates of relevance.

13. The non-transitory computer-readable medium of claim 12, further comprising instructions which, when performed by the computer, cause: displaying the search results reordered according to the updated estimates of relevance.

14. The non-transitory computer-readable medium of claim 12, further comprising instructions which, when performed by the computer, cause: updating the weights when no search result on a current search result page is clicked on and a "next-page" button is clicked on.

15. The non-transitory computer-readable medium of claim 12, further comprising instructions which, when performed by the computer, cause: storing in the data storage device a user profile with information selected from the group consisting of: the user's demographic information, one or more query words the user entered before, one or more results the user clicked on before, and weights for symbol pairs obtained in the user's previous searches.

16. The non-transitory computer-readable medium of claim 15, further comprising instructions which, when performed by the computer, cause: augmenting the query by information from the user profile.

* * * * *